United States Patent
Hommel et al.

(10) Patent No.: US 6,803,736 B1
(45) Date of Patent: Oct. 12, 2004

(54) CONTROL SYSTEM WHICH CARRIES OUT THE MODEL-SUPPORTED SAFETY MONITORING OF AN ELECTRONICALLY REGULATED CONTROLLER IN THE MOTOR VEHICLE

(75) Inventors: Mathias Hommel, Wolfsburg (DE); Wolfgang Kraemer, Ingolstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,298

(22) PCT Filed: May 19, 2000

(86) PCT No.: PCT/DE00/01587

§ 371 (c)(1),
(2), (4) Date: Mar. 5, 2002

(87) PCT Pub. No.: WO00/72100

PCT Pub. Date: Nov. 30, 2000

(30) Foreign Application Priority Data

May 19, 1999 (DE) .......................................... 199 22 979
Apr. 18, 2000 (DE) .......................................... 100 19 152

(51) Int. Cl.[7] ........................ G05B 19/10; G05B 23/02; H02H 7/08; B62D 5/04
(52) U.S. Cl. ........................ 318/567; 318/564; 318/565; 318/639; 318/798; 318/806; 361/23; 388/907.5; 388/909; 180/404; 180/443
(58) Field of Search .......................... 318/567, 563, 318/564, 565, 638, 639, 650–652, 798, 799, 805, 806; 388/800, 842, 907.5, 909; 180/404, 443, 446; 361/23, 30, 31, 33, 54, 56, 57, 78, 79, 86, 87

(56) References Cited

U.S. PATENT DOCUMENTS

| | | | |
|---|---|---|---|
| 4,159,444 A | 6/1979 | Bartlett et al. | 318/564 |
| 4,345,191 A | 8/1982 | Takats et al. | 318/564 |
| 4,509,110 A | 4/1985 | Levesque, Jr. et al. | 364/153 |
| 4,641,517 A | 2/1987 | Spock et al. | 73/116 |
| 5,233,512 A | 8/1993 | Gutz et al. | 364/150 |
| 5,442,268 A * | 8/1995 | Goodarzi et al. | 318/432 |
| 5,475,289 A * | 12/1995 | McLaughlin et al. | 318/432 |
| 5,545,957 A * | 8/1996 | Kubo et al. | 318/432 |
| 5,920,174 A * | 7/1999 | Kawada et al. | 318/663 |
| 6,085,860 A * | 7/2000 | Hackl et al. | 180/443 |
| 6,218,801 B1 * | 4/2001 | Brog.ang.rdh et al. | 318/567 |
| 6,226,579 B1 * | 5/2001 | Hackl et al. | 180/422 |
| 6,392,418 B1 * | 5/2002 | Mir et al. | 318/439 |
| 6,407,524 B1 * | 6/2002 | Endo et al. | 318/432 |

FOREIGN PATENT DOCUMENTS

| | | | |
|---|---|---|---|
| EP | 0 526 418 | 2/1993 | B62D/7/14 |
| EP | 0 660 017 | 6/1995 | F16K/37/00 |
| EP | 0 864 949 | 9/1998 | G05B/17/02 |
| FR | 2624988 A1 * | 6/1989 | G05B/11/26 |
| JP | 01186185 A * | 7/1989 | H02P/5/00 |
| JP | 02290774 A * | 11/1990 | B62D/5/04 |

* cited by examiner

Primary Examiner—David Martin
Assistant Examiner—Edgardo San Martin
(74) Attorney, Agent, or Firm—Baker & Daniels

(57) ABSTRACT

A system for controlling a regulator equipped with an electric servomotor in a motor vehicle. With reference to an example of an electronic steering system that has an electric-motor steering regulator, output parameters are generated by a model-assisted monitor for evaluating the suitability of a correction for the regulator, and thus criteria for a possible shutdown or to initiate emergency action, as a function of setpoint parameters for the electric servomotor, of instantaneous parameters measured by individual sensors, and of the driving state, and, based on a setpoint behavior of the regulator and on a model simulating the control sections it contains.

18 Claims, 5 Drawing Sheets

CONTROL SYSTEM WHICH CARRIES OUT THE MODEL-SUPPORTED SAFETY MONITORING OF AN ELECTRONICALLY REGULATED CONTROLLER IN THE MOTOR VEHICLE

BACKGROUND OF THE INVENTION

This invention relates to a system for controlling a regulator in a motor vehicle and the use of this control system for an electronic steering system, a sway stabilization system, brake system, and a steering wheel simulator.

In a prior art control system, a parallel model forms an estimated parameter for the instantaneous value originating from the setpoint by simulating the control loop and affects the transmission properties of a gearshift, which in turn determines the gearshift parameter from the estimated parameter. Safety aspects are not affected by the model-assisted estimation of the prior art control system.

The purpose of electric-motor regulators in motor vehicles is often to set positions with high speed and accuracy. Despite robust controls, the desired position can often not be reached within the required time. This is determined on the one hand by the characteristics of the regulator, such as its inertia and PDI properties, and on the other hand by the servomotor used, for example its counter-torque.

As an example, an electronic steering system may be mentioned. Safety aspects play a large role in an electronic steering system. Decisions have to be made in the safety design for evaluating the regulated parameters (positional accuracy and speed of the electric motor used as the steering regulator), and as the case may be, turning off the electronic steering system has to be initiated. One problem of the safety design to be set up for this consists of finding the proper criterion for turning off the electronic steering system. Simple interpretation of the signals from the sensors in the electronic steering system does not lead to the target; instead, the dynamic behavior of the system has to be taken into consideration.

It is the purpose of the instant invention to describe a control system of th type so that it can evaluate the drive signals necessary for the safety monitoring of an electric-motor regulator (reach the setpoint position in a definite time), and can make decisions for turning it off.

SUMMARY OF THE INVENTION

As an important aspect, the control system pursuant to the invention contains a model-assisted monitoring device that provides the necessary information for being able to evaluate the suitability of the correction with reference to a model of the servomotor.

For this purpose, the monitoring device has a load torque estimator and models for the servomotor and for the control section, and an error interpreter device, which undertakes steps for the safety of the units adjusted by the regulator and of the vehicle, independently of the theoretical values determined by the models and of the load torque estimate.

The result of the load torque estimation serves the error interpreter device for deciding on the validity of the actual current and position differential signals determined by the modeling.

The model of the servomotor determines the load torque actually applied by the motor. Thereupon, the load torque to be applied by the servomotor is estimated as a function of the operating condition, and is compared with the instantaneous load torque determined with reference to the model.

With knowledge of the load, the parameters of the instantaneous current and position of the servo drive can then be calculated through the control model of the control section, which in turn are again compared with the measured values and checked for plausibility by the error interpreter device within established limits. A safety system designed using the control system and monitoring device pursuant to the invention makes the described plausibility monitoring the basis for deciding whether the system is turned off or not.

Using the model of the current control circuit and the model of the position control circuit, estimated condition parameters are set up for the instantaneous current and instantaneous position values.

The estimated values are fed to the error interpreter device in order to control the safety system, i.e., for example, to initiate the shutdown of the regulator mechanism.

In the electronic steering system chosen as an example of embodiment, the theoretical value of the load torque estimated with the load torque estimator is accordingly determined or calculated with the assistance of characteristics and knowledge of the possible load states. If the vehicle is also equipped with power steering, the (relatively simple) characteristic line or characteristic field of the servo steering is also stored in the load torque estimator. Depending on the steering angle, measured by an angle sensor, and/or on the steering rate, an estimated value of the load torque is determined from the field of characteristic lines. By comparing the actually measured load with the theoretically possible load, it can be determined whether the steering servomotor is operating in orderly fashion or whether extraordinary external conditions or a defect of the servomotor makes it necessary to turn off the system.

In the example of the servomotor for an electronic steering system for single-wheel steering or for steering of two wheels connected to one another through a tie rod, it can thus be differentiated whether the servomotor is in the fully operable working range, or whether a malfunction may make a shutdown necessary.

An important benefit of using the control system pursuant to the invention for an electronic steering system lies in the fact that only with the assistance of angle sensors and a current sensor—without a torque sensor—it can be judged whether the control system is operating in orderly fashion or whether a shutdown of the system is necessary because of a broken shaft, worn bearing, broken gear, increased frictional forces from wear, and the like, or because of extraordinary external conditions (for example, steering into the curbing).

It should be emphasized here explicitly that the principles pursuant to the invention can be used not only for electronic steering systems, but also in motor vehicles for other regulators using an electric servomotor, for example for electronic brake systems, sway stabilizers, steering wheel simulators for steer-by-wire applications, and automatic suspension- and/or level-control systems, in which safety aspects likewise play an important role.

The control system pursuant to the invention is described generally in detail below, and by way of example, its use for an electronic steering system used for an electric-motor steering regulator, with reference to the drawing.

DESCRIPTION OF THE PREFERRED EMBODIMENT

Figure 1:
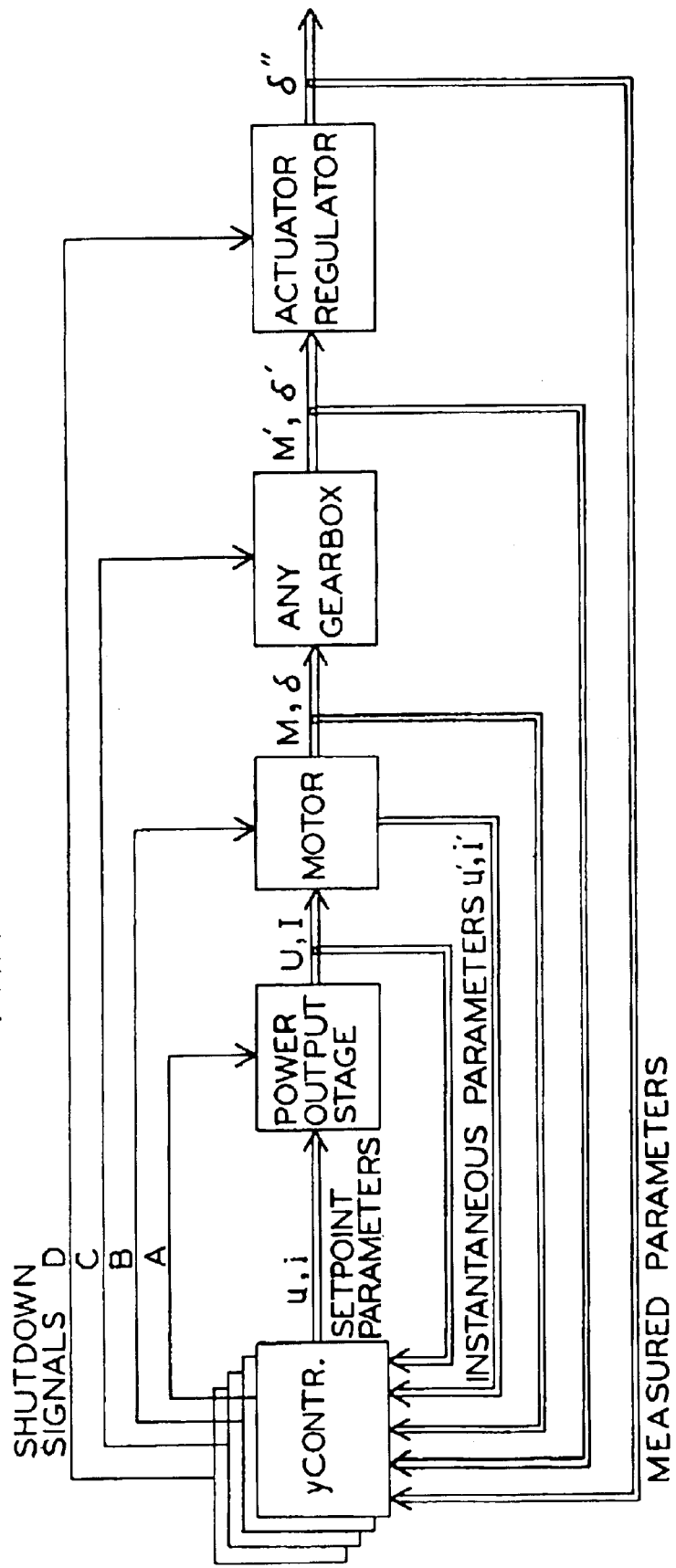
FIG. 1 shows a block diagram of a general principle of a control system for an electric-motor drive.

In the general principle of a control system for an electric-motor drive illustrated as a block diagram in FIG. 1, a control unit that has one or more microcontrollers receives instantaneous parameters U, I from a power output stage, u', i', M, δ from an electric motor, M', δ' from an optional gearbox, and δ" from an actuator. From these measured instantaneous parameters fed to it, the microcontroller control unit can generate setpoint parameters u, i, and shutdown signals A, B, C, and D, which are fed respectively to the power output stage, the motor, the gearbox, and the actuator for shutdown.

The mentioned parameters called shutdown signals or measured parameters are general in form and do not represent any dimension in an implemented control system. In other words, the shutdowns that are undertaken and the signals that have to be measured depend on the concrete design of the control system.

Figure 2:
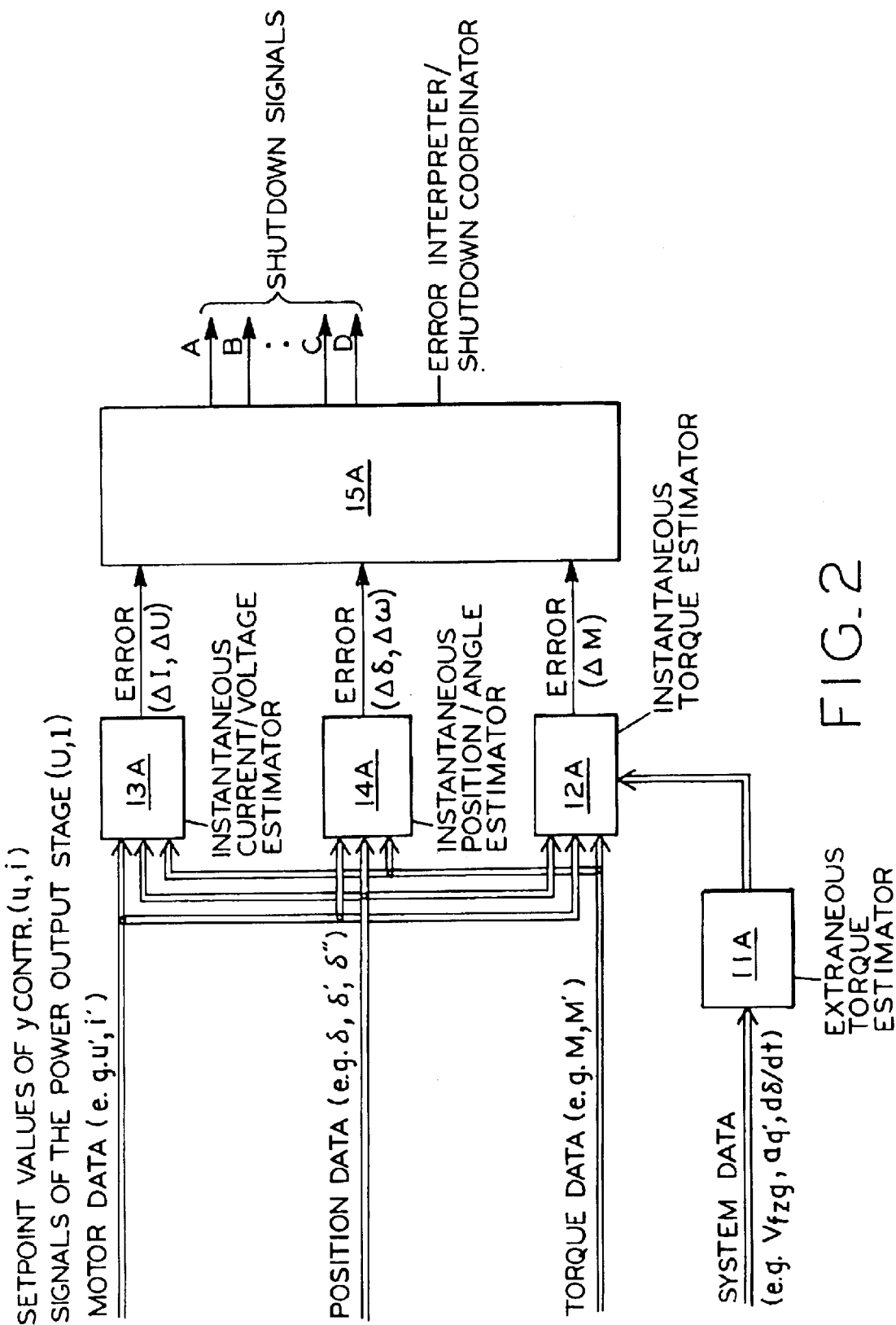
FIG. 2 shows a block diagram of a model-assisted safety monitor for servo drives embodying aspects pursuant to the invention.

FIG. 2 shows a block diagram of a model-assisted safety monitor according to the invention for servo drives provided with an electric servomotor.

This monitoring device illustrated in FIG. 2 can be implemented in the microcontroller unit shown in FIG. 1, or can be embodied as a separate unit.

FIG. 2 shows an extraneous torque estimator 11A, an instantaneous torque estimator 12A, an instantaneous position/angle speed estimator 14A, an instantaneous current/voltage estimator 13A, and an error interpreter/shutdown coordinator device 15A, which generates shutdown signals A, B, C, and D from the error signals fed to it by the estimators 12A, 13A, 14A.

In detail, the instantaneous torque estimator 12 A, the instantaneous current/voltage estimator 13A, and the instantaneous position/angle speed estimator 14A receive torque data, for example M, M', position data, for example δ, δ', δ", motor data, for example u', i', signals from the power output stage U, I, and setpoint data of the microcontroller u, i. The extraneous torque estimator 11A receives data that depend on the system, for example a vehicle speed $V_{Fzg}$, a vehicle transverse acceleration $a_q$, and/or the time derivative dδ/dt of an angular position δ.

In accordance with the invention, the extraneous torque estimator 11A generates a theoretical extraneous torque as a function of the supplied system-dependent parameters, and of any supplied instantaneous parameters measured by sensors.

The instantaneous current/voltage estimator 13A and the instantaneous position/angle speed estimator 14A constitute a control model of the control section, and the instantaneous torque estimator 12A constitutes a model of the servomotor, and depending on the setpoint data fed to them, the position data and the torque data, and the theoretical extraneous torque estimated by the extraneous torque estimator, they calculate a theoretical instantaneous value for the position and/or for the actually applied torque and/or the current of the servomotor, and the error signals emitted by the estimators each calculate differential signals between the calculated theoretical instantaneous value and the corresponding instantaneous value measured by sensor or a value derived directly from at least one value measured by sensor. The error signals are then input to the error interpretation shutdown coordinator device 15A as a measure of the suitability of the correction of the regulator, which can optionally then generate the shutdown signals from the various error signals.

Figure 3:
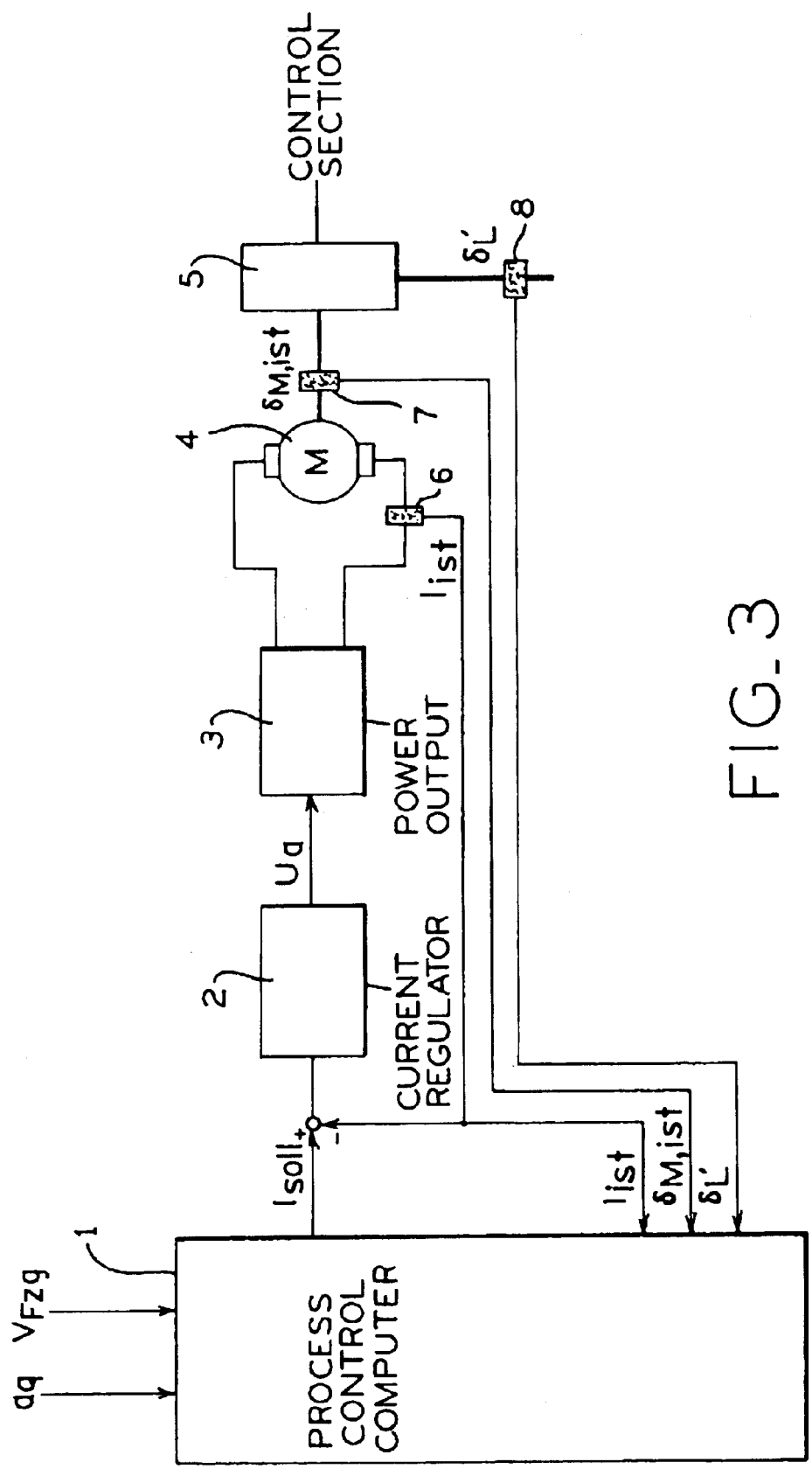
FIG. 3 shows a block diagram of a servo drive in a motor vehicle using an electric motor.

A servo drive in the motor vehicle with an electric servomotor 4 is shown in FIG. 3. It consists of a process control computer 1 that evaluates whether or not the system has to be shut down because of position errors or time errors that are too large, depending on the input signals for instantaneous current $I_{ist}$ supplied by a current sensor 6, the instantaneous position $δ_{M,ist}$ of the electric servomotor 4 supplied by the position sensor 7, the instantaneous position $δ_{L'}$ of the control section 5 supplied by the position sensor 8, and signals that indicate an operating state of the motor vehicle.

The electric servomotor 4 is an electric drive motor of a suitable type. By way of example, a permanent magnet d.c. motor may be mentioned here. Alternatively, an electronically commutated motor (a so-called EC motor), an asynchronous motor, especially a three-phase asynchronous motor, or a piezoelectric motor are suitable.

The output position of the electric servomotor 4 is measured in FIG. 3, by way of example, by an angle sensor 7.

The control section 5, i.e. the element to be adjusted, is a device that converts mechanical energy from one form of motion to another. As an example, a mechanical gearbox or overlay transmission, for example a planetary drive, may be mentioned here. The electric servomotor 4 is driven by a power output stage 3, not further defined here, that in turn obtains its control signal $U_a$ from a current regulator 2. The current regulator 2 regulates that voltage $U_a$ that is fed to the electric servomotor 4 based on the current differential between a setpoint current $I_{soll}$ prescribed by the process control computer 1 and the instantaneous current $I_{ist}$ that is delivered by the current sensor 6.

The setpoint current $I_{soll}$ in turn is prescribed for the process control computer 1 by a position regulator not further defined here.

Figure 4:
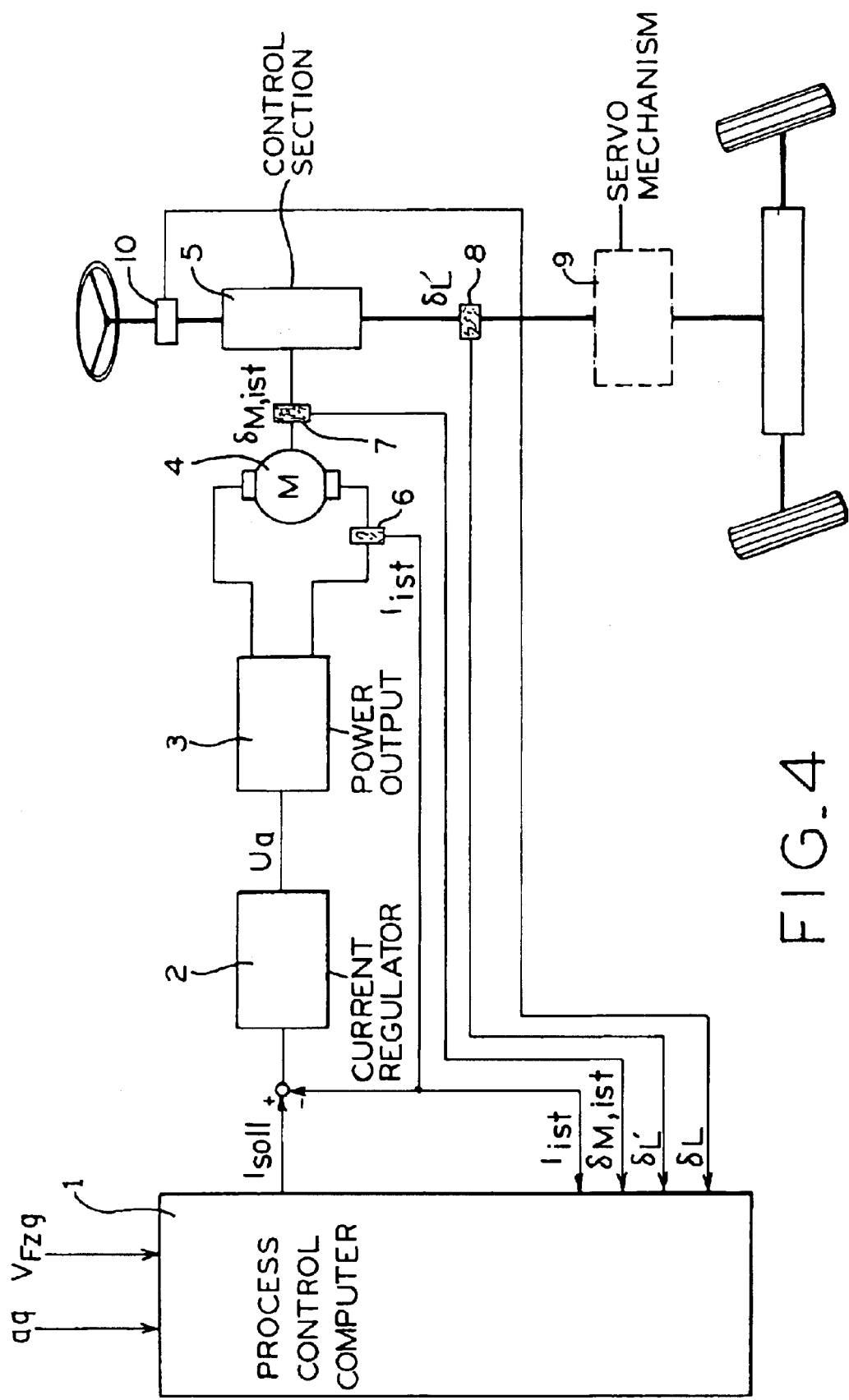
FIG. 4 shows a block diagram of an example of embodiment of a regulator for an electronic steering system.

FIG. 4 shows an electric-motor steering regulator for an electronic steering system, by way of an example of embodiment. The example shown is oriented toward electronic steering regulation of two wheels (front wheels) connected to one another by a tie rod, but it can be applied directly to an electronic steering system in which there is an electric-motor steering regulator for each of the steered wheels. It should be pointed out that FIG. 4 contains the block diagram of FIG. 3 and is supplemented by the components and signals specific for the steering regulator.

According to FIG. 4, in addition to the instantaneous current $I_{ist}$ from the current sensor 6, the instantaneous position $δ_{M,ist}$ of the electric motor 4 serving as the steering regulator, which is supplied by the position sensor 7, and the instantaneous position $δ_{L'}$, for example of an overlay transmission 5, the process control computer 1 receives a steering wheel angle $δ_L$ from an angle sensor 10 connected to the steering wheel shaft, and sensor signals $a_q$, $V_{Fzg}$, that indicate the driving state of the vehicle, and that are supplied by sensors not shown or by other control instruments contained in the vehicle. From the measured or determined input signals input to it, the process control computer I determines the desired setpoint current $I_{soll}$, which is compared with the measured instantaneous current $I_{ist}$. The comparison signal generated by the comparison is input to the current regulator 2, which builds a regulated voltage $U_a$ for the power output stage 3.

The electric motor 4 used as a steering regulator, for example, is a permanent magnet d.c. motor that impacts an input of the overlay transmission 5. The other input of the overlay transmission 5 is impacted by the steering wheel angle $\delta_L$ given by the driver to the steering wheel. The overlay transmission 5 at its output generates a superimposed steering angle $\delta_L'$, which is measured, as mentioned, by an angle sensor 8. The superimposed steering angle $\delta_L'$ generated by the overlay transmission is then fed, as the case may be, through a servo mechanism 9 to the steering drive, and thus to the steered wheels.

The functions described so far with reference to FIG. 4, of an electronic steering system equipped with an electric motor as steering regulator, are known.

The purpose of this invention is to provide the information necessary in this example of embodiment for the safety monitoring of such an electric-motor steering regulator, in order to evaluate the suitability of the correction of the drive (reaching the setpoint position in a definite time), and to be able to make decisions on shutting down.

The difficulty in the safety concept consists of finding the proper criterion that leads to a shutdown. Solely interpreting the signals supplied by the mentioned sensors does not lead to the objective; instead, the dynamic behavior of the entire system has to be taken into consideration.

Figure 5:
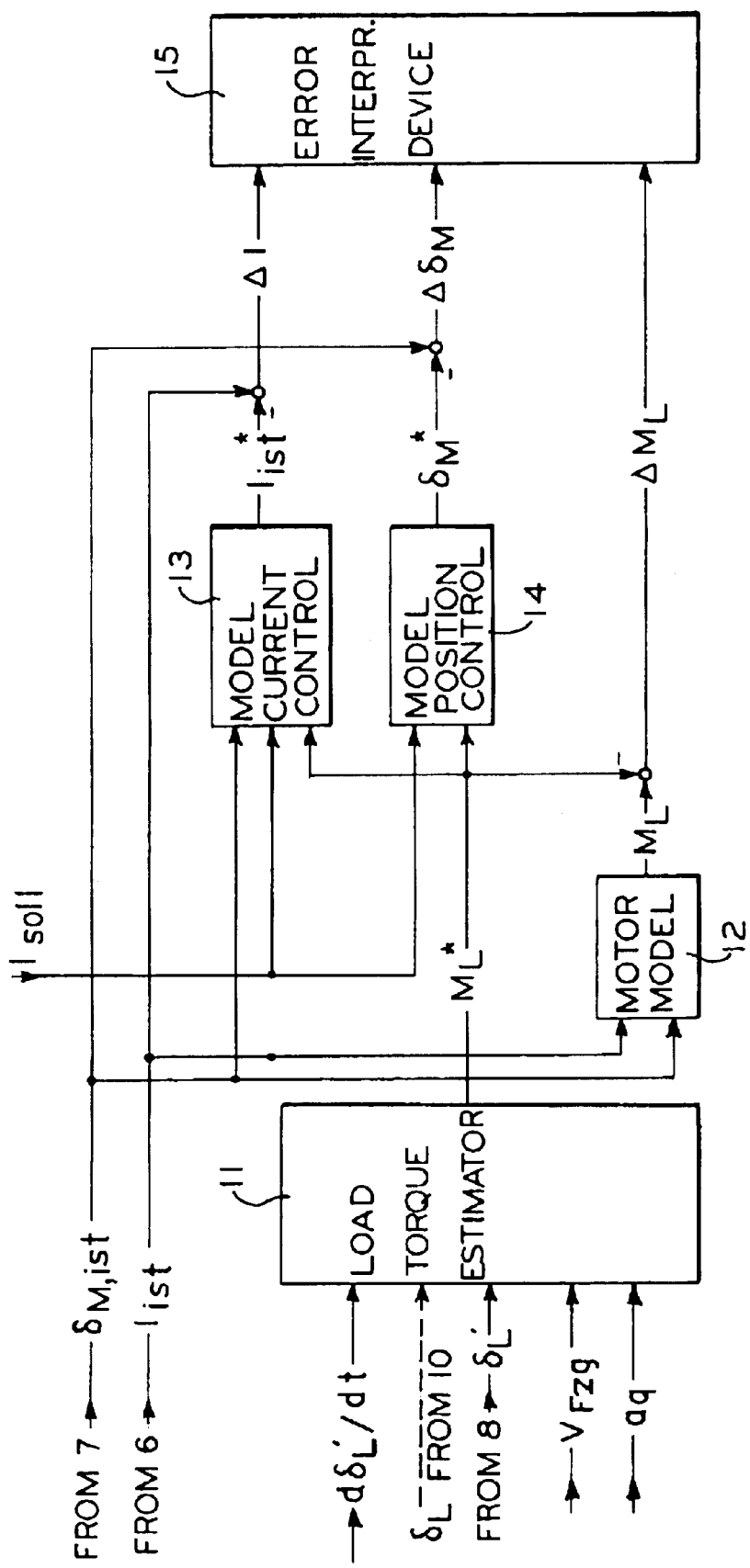
FIG. 5 shows a block diagram of a model-assisted monitoring device pursuant to the invention to generate information for evaluating the suitability of the correction, for example of the steering regulator according to FIG. 4.

FIG. 5 shows a schematic functional block diagram of an example of embodiment of the model-assisted monitoring device pursuant to the invention (cf. FIG. 2), used for example on a safety monitor of an electric-motor steering regulator, as shown in FIG. 4 and described above.

In the example of embodiment pursuant to the invention, there is a load torque estimator 11 that estimates a theoretical load torque $M_L^*$ that the electric-motor steering regulator 4 would have to apply with this specific driving state of the vehicle, based on the driving state of the vehicle as indicated, for example, by a vehicle speed signal $V_{Fzg}$ and a transverse acceleration signal $a_q$, and based on signals supplied by appropriate sensors, for example the steering angle $\delta_L'$ supplied by the angle sensor 8 to the output of the overlay transmission 5 and its time derivative $d\delta_L'/dt$.

If the steering system of the vehicle is equipped with power steering (servo steering) 9, the characteristic line or the characteristic field of the servo steering 9 is stored in the load torque estimator 11. Then an estimated value $M_L^*$ for the load torque can be determined by the load torque estimator 11 as a function of the steering wheel angle $\delta_L$ measured by the angle sensor 10 or of the rate of steering at the steering wheel $d\delta_L/dt$, or of the time derivative $d\delta_L/dt$ of the output steering angle $\delta_L'$ measured by the angle sensor 8, with reference to the characteristic line field.

The estimated load torque $M_L^*$ theoretically to be applied, estimated by the load torque estimator 11, is compared in a comparison element with the torque $M_L$ actually applied by the electric-motor steering regulator 4, which has been calculated using a motor model 12 from the instantaneous current $I_{ist}$ measured by the current sensor 6 and the instantaneous position $\delta_{ML\square}$, measured by the angle sensor 7. The motor model 12 is a model based on the mechanical model of the d.c. motor 4.

The torque differential $\Delta M_L$ generated the comparison element is fed to an error interpretation device 15. The various decisions are made in the safety concept of the electronic system as a function of the magnitude and dynamics of the error, i.e. immediate shutdown, emergency action, sound warning signal, etc. As will be discussed below, the validity or plausibility of the signals $\Delta I$, and $\Delta \delta_M$ supplied by a model current control circuit 13 and a model position control circuit 14 to the error interpretation device is also decided.

The model current control circuit 13 is distinguished by the fact that utilizing the regulation model of the control section, and using the parameters $I_{soll}$, $\delta_{M,ist}$, and $M_L^*$ as input parameters, a theoretical value for the instantaneous current $I_{ist}^*$ is calculated, which should be set for the current input of the electric motor 4 with the setpoint current $I_{soll}$. The theoretical value $I_{ist}^*$ of the instantaneous current determined by the model current control circuit 13 is then compared with the instantaneous current $I_{ist}$ measured by the current sensor 6. The current differential $\Delta I$ is fed to the error interpretation device 15.

The model position control circuit 14 calculates a theoretical value for the instantaneous position $\delta_M^*$ of the servomotor 4, utilizing the control model of the position control section using the input parameters $I_{soll}$ and $M_L^*$. This theoretical value $\delta_M^*$ of the servomotor 4 should theoretically be set at the input of the setpoint current $I_{soll}$ into the servomotor 4. The value $\delta_M^*$ of the instantaneous position determined theoretically from the model position control circuit 14 is then compared with the angle $\delta_{M,ist}$ measured by the angle sensor 7. The position differential $\Delta \delta_M$ is likewise fed to the error interpretation device 15.

The error interpretation device 15, as already mentioned, evaluates the two differential signals $\Delta I$ and $\Delta \delta_M$ for validity or plausibility. If valid, the differential signals $\Delta I$ and $\Delta \delta_M$ in combination with $\Delta M_L$ from Unit 12 initiated by the error interpretation device, not further described here, initiates other measures of the safety system, for example immediate shutdown, emergency action, sound warning signals, etc. Of course, as mentioned, the validity of the theoretical output signals $I_{ist}^*$ and $\delta_M^*$ received from the model current control circuit 13 and from the model position control circuit 14 may be questioned because of the torque differential $\Delta M_L$ originating from the motor model 12.

It should be mentioned that the function blocks of the model-assisted monitoring device shown in FIG. 5 and described above may be physical components of the process control computer 1 according to FIG. 3 that is set up for the purpose. With the example of embodiment described above of the model-assisted monitoring of an electric-motor regulator of a control system for an electronic steering system pursuant to the invention, it can be judged just with the angle and current measurement sensors described and explicitly indicated in FIG. 3, without any torque sensor, whether the steering system is operating in orderly fashion or whether a shutdown or an emergency action of the electronic steering system is indicated, for example because of a broken shaft, bearing wear, broken gear tooth, increased friction, or because of extraordinary external circumstances, for example those that can occur when steering the vehicle into a curbstone.

The same applies appropriately to other applications of the control system or of the model-assisted monitoring device pursuant to the invention not described in detail, for example to a regulator for a sway stabilization system or for an electronic brake system in a motor vehicle, in which evaluation of the suitability of the correction of the regulator used can likewise be carried out using the model-assisted monitoring device.

What is claimed is:

1. A control system for use in a motor vehicle, said motor vehicle including an actuator regulator and an electric servomotor, said control system comprising:

a current regulator which determines a correct current parameter value on the basis of comparing a setpoint value which is determined from an operating state of the motor vehicle and which corresponds to a desired set position, and an instantaneous value which corresponds to an instantaneous set position of the actuator regulator;

a model assisted monitor which generates an output evaluating parameter value for evaluating the suitability of correcting the actuator regulator as a function of servomotor setpoint parameters, a plurality of instantaneous parameters measured by a plurality of sensors, and the current operating state of the vehicle, said output evaluating parameter value is based on a model which simulates setpoint behavior of the action regulator, said model-assisted monitor having a load torque estimator which estimates a theoretical load torque as a function of at least one of said plurality of instantaneous parameters which comprise instantaneous position values and the operating state of the vehicle, said model-assisted monitor including a control section control model and a servomotor model, said model-assisted monitor calculates theoretical instantaneous values for the servomotor position, the actual applied servomotor torque, and the instantaneous servomotor current, as a function of the servomotor setpoint parameters and the estimated theoretical load torque, said model-assisted monitor generating a different signal from the calculated theoretical instantaneous values and corresponding actual instantaneous values, whereby suitability of correcting the actuator regulator can be evaluated.

2. Control system pursuant to claim 1 wherein said model-assisted monitor compares the estimated theoretical load torque with the actual applied servomotor torque, which is calculated by means of a motor model of the servomotor as a function of a measured instantaneous value of motor current and of an instantaneous motor position measured by a corresponding position sensor, said model-assisted monitor generates a torque differential signal from the comparison for evaluating the suitability of the correction.

3. Control system pursuant to claim 2, wherein said model-assisted monitor calculates a theoretical instantaneous current value for the servomotor current as a function of the setpoint current of the servomotor, the instantaneous motor position measured by a corresponding position sensor, and the theoretical load torque, and generates a differential signal between the calculated instantaneous current value and the instantaneous current value measured by a current sensor for evaluating the suitability of the correction.

4. Control system pursuant to claim 3, wherein said model-assisted monitor calculates a theoretical instantaneous position value for the position of the servomotor that should be set in reaction to the setpoint parameter at the servomotor, and generates a differential signal between the calculated theoretical instantaneous position value and the position value measured by a corresponding position sensor for evaluating the suitability of the correction.

5. Control system pursuant to claim 4, wherein said model-assisted monitor includes an error interpreter that receives the torque differential signal, the instantaneous current differential signal, and the position value differential signal as input parameters and generates therefrom safety-relevant error and failure signals.

6. Control system pursuant to claim 5, wherein the error interpreter decides on the validity of the instantaneous current differential signal and the instantaneous position value differential signal as a function at least of the torque differential signal.

7. Control system pursuant to claim 1, wherein the electric servomotor is a permanent magnet d.c. motor.

8. Control system pursuant to claim 1, wherein the electric servomotor is an electronically commutated motor.

9. Control system pursuant to claim 1, wherein the electric servomotor is a three-phase asynchronous motor.

10. Control system pursuant to claim 1, wherein the electric servomotor is a piezoelectric motor.

11. Control system pursuant to claim 1, wherein the electric an asynchronous motor.

12. The control system pursuant to claim 1, and further including an electronic steering system that has an electronic steering servomotor, which superimposes an additional steering angle on a steering wheel angle given by a driver to a steering wheel for one of each of a left and right wheel, and two wheels linked together, and wherein the model-assisted monitor provides signals for the safety monitoring of the steering system.

13. The control system pursuant to claim 12, wherein the steering system is set up for individually steering a left wheel and a right wheel.

14. The control system pursuant to claim 12, wherein the steering system is set up to steer two wheels connected by a tie rod.

15. The control system pursuant to claim 13, including a safety monitor which initiates one of the safety measures from the group consisting of activating an error indicator, sounding a warning signal, initiating emergency action, and shutting down the electronic steering system.

16. The control system pursuant to claim 1, including an electronic sway stabilization system that has at least one electric sway stabilizing motor.

17. The control system pursuant to claim 1, including an electronic brake system that has at least one electric brake servomotor.

18. The control system pursuant to claim 1, including an steering wheel simulator for steer-by-wire steering wherein a counter-torque dependent on the state of the vehicle is generated as a function of the driver's steering desires.

* * * * *